May 7, 1946.   C. W. MOTT   2,399,756
FLUID CONTROL FOR FLUID-DRIVEN MOTORS
Filed Dec. 31, 1943   10 Sheets-Sheet 3
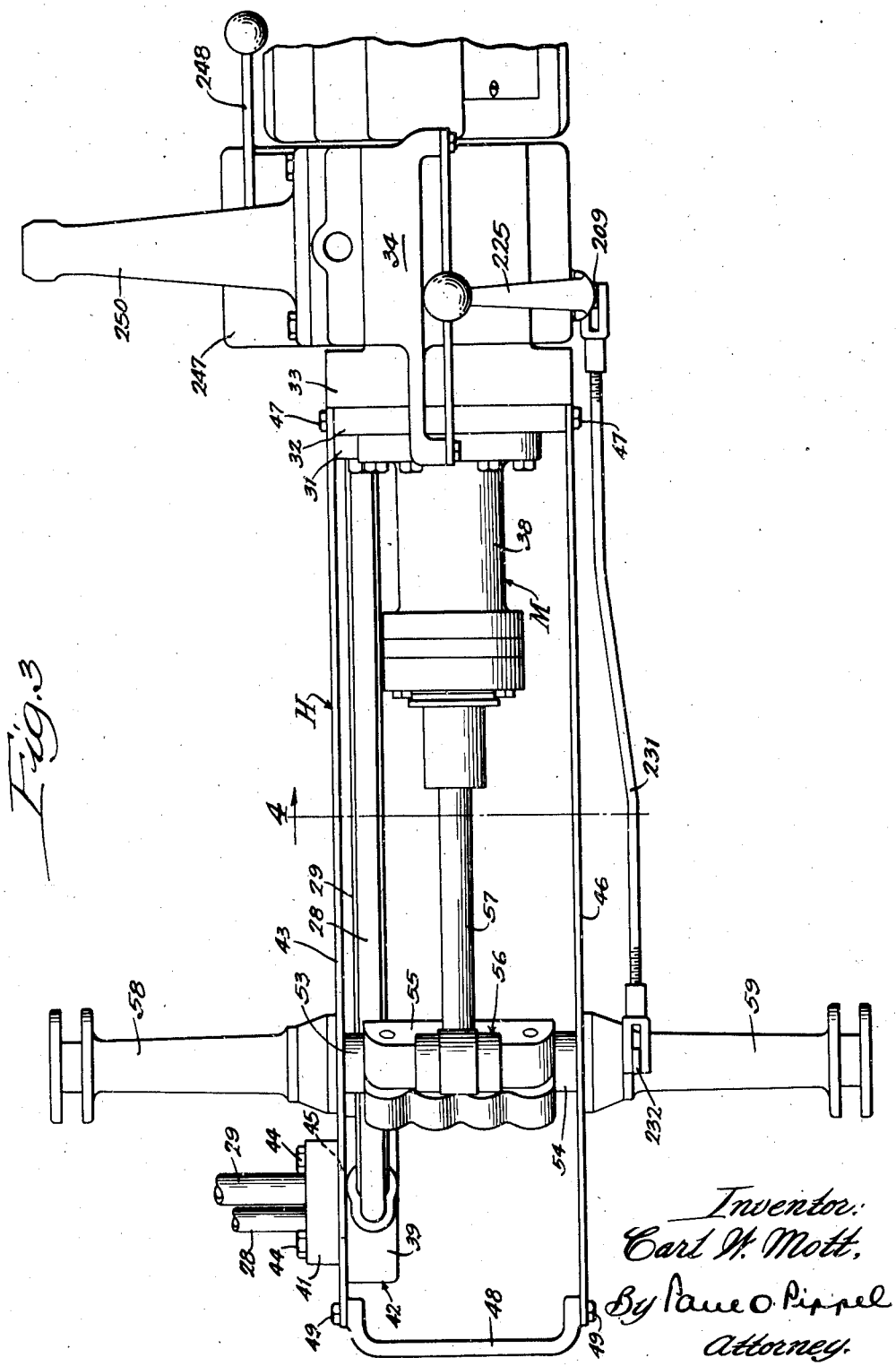

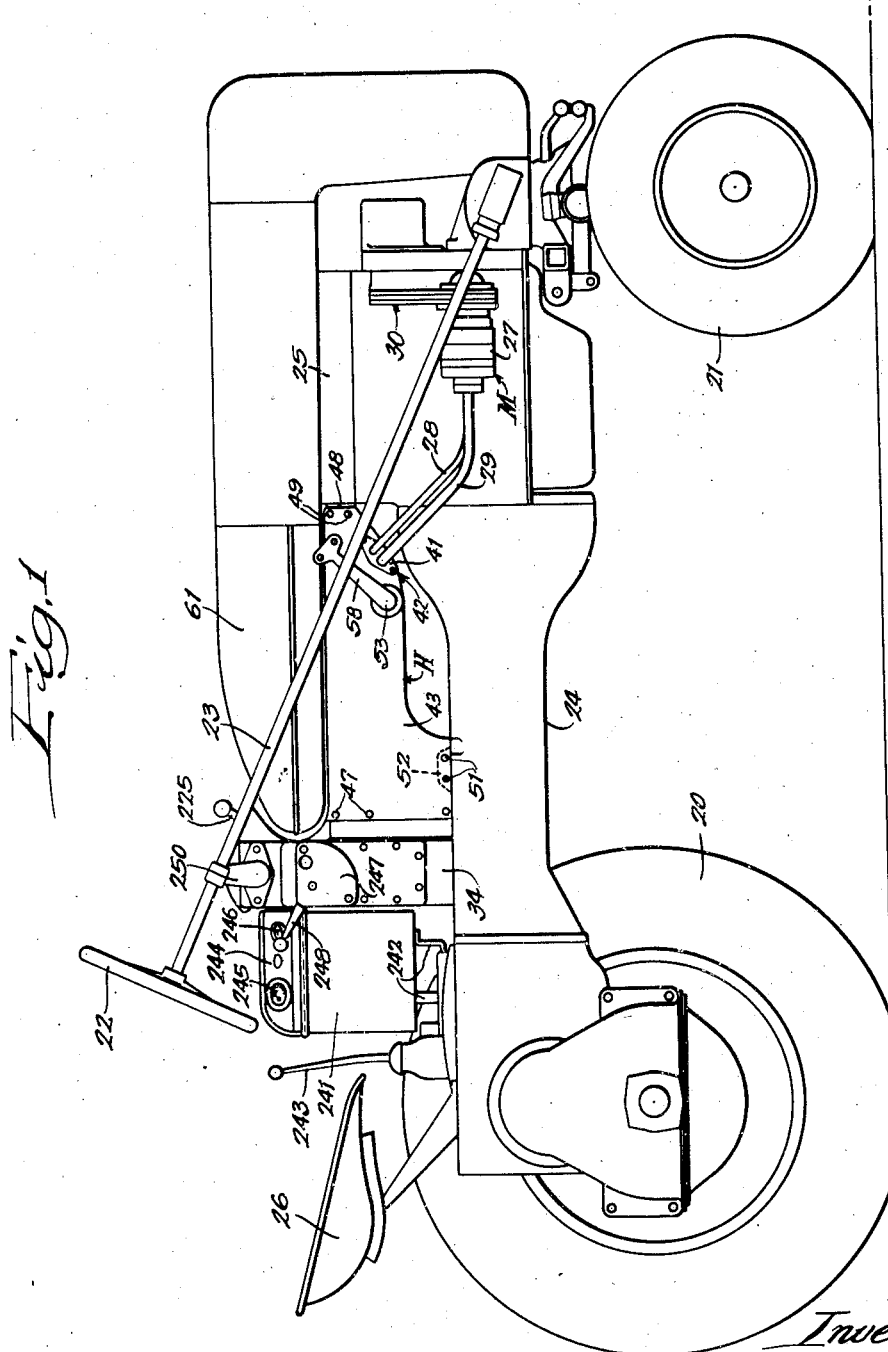

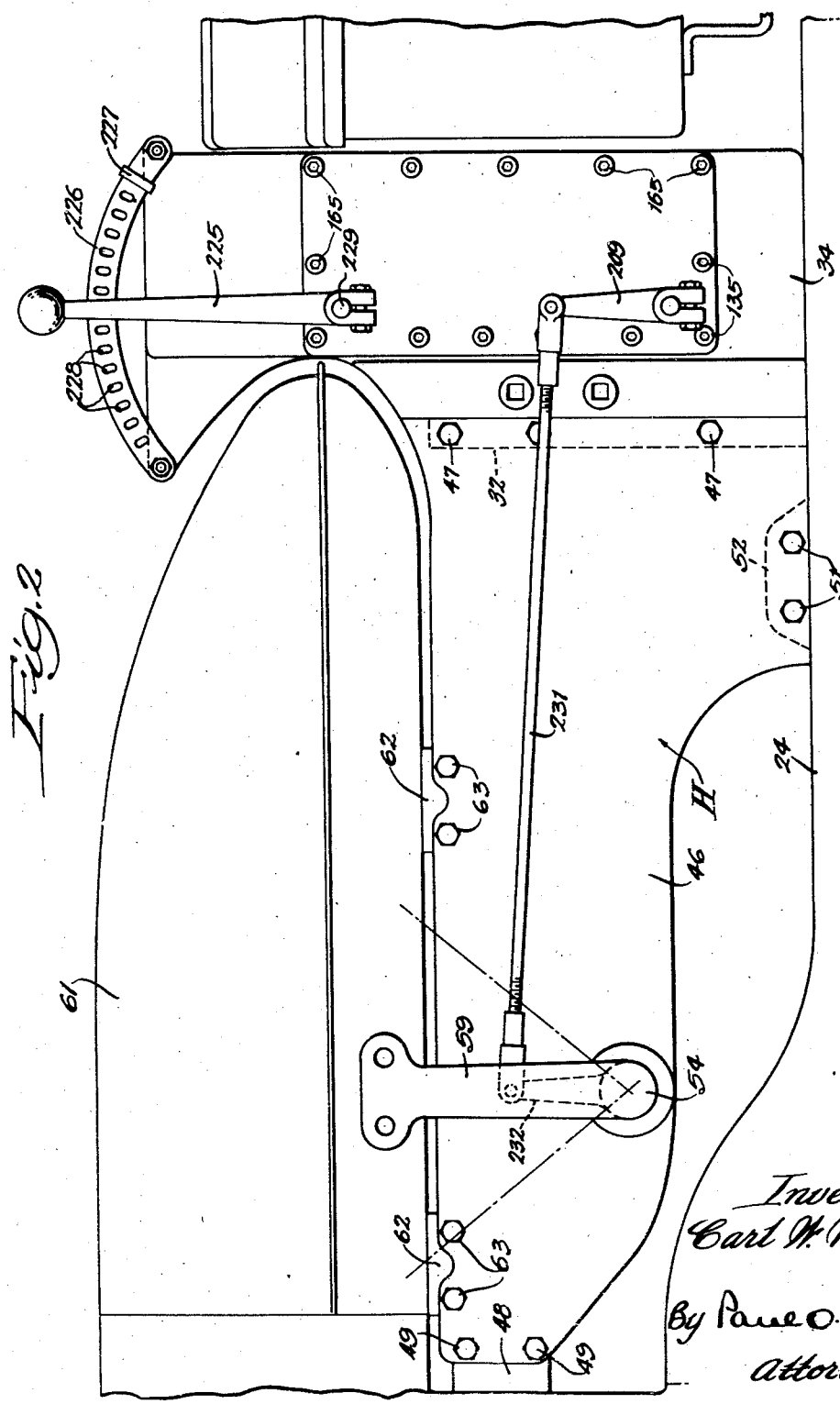

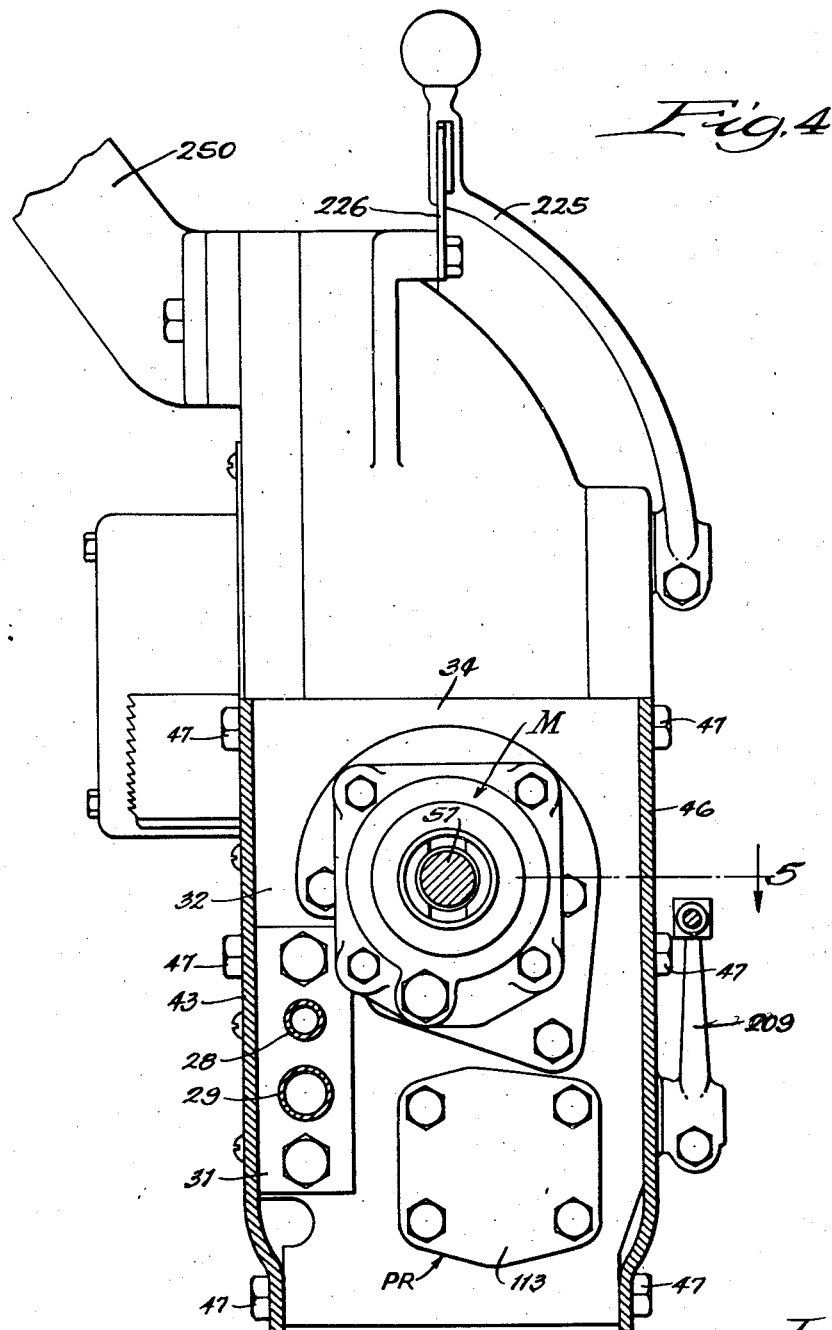

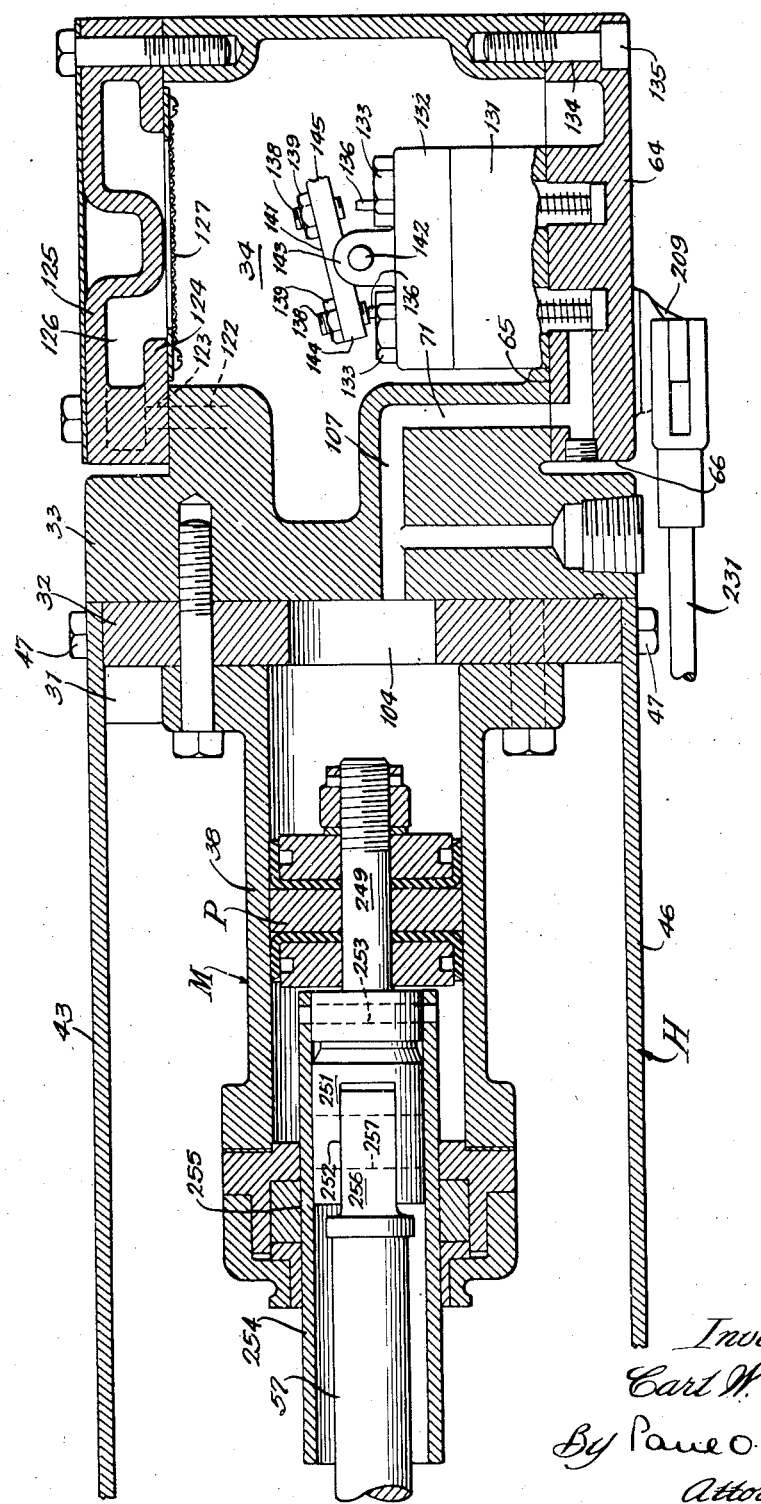

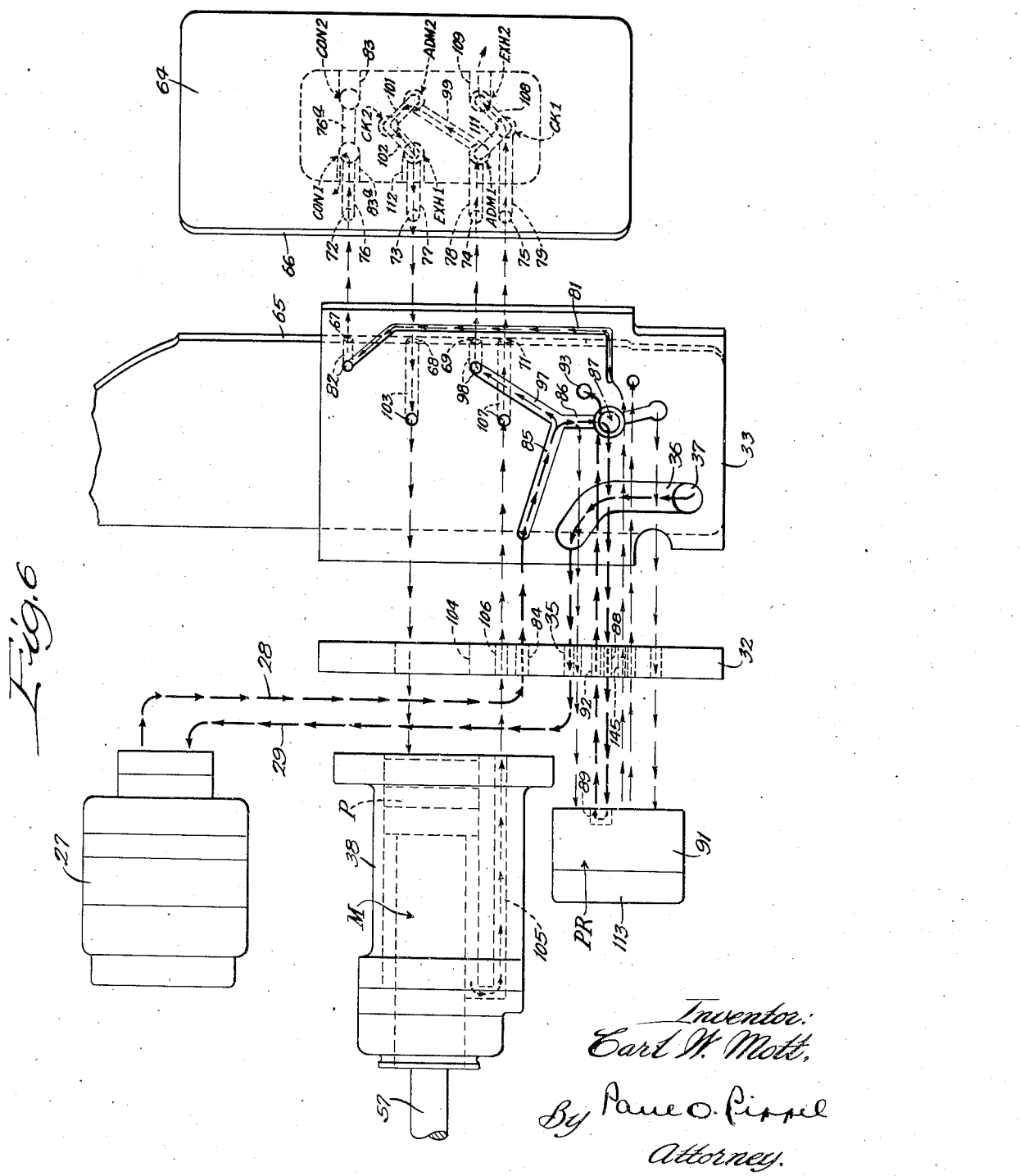

May 7, 1946. C. W. MOTT 2,399,756
FLUID CONTROL FOR FLUID-DRIVEN MOTORS
Filed Dec. 31, 1943 10 Sheets-Sheet 7

Inventor:
Carl W. Mott,
By Paul O. Pippel
Attorney.

May 7, 1946.   C. W. MOTT   2,399,756
FLUID CONTROL FOR FLUID-DRIVEN MOTORS
Filed Dec. 31, 1943   10 Sheets-Sheet 8
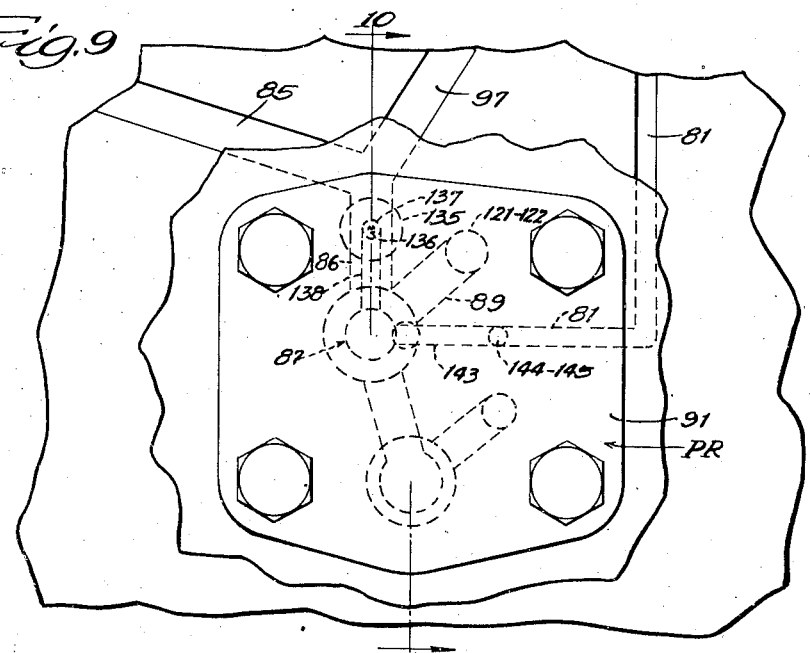
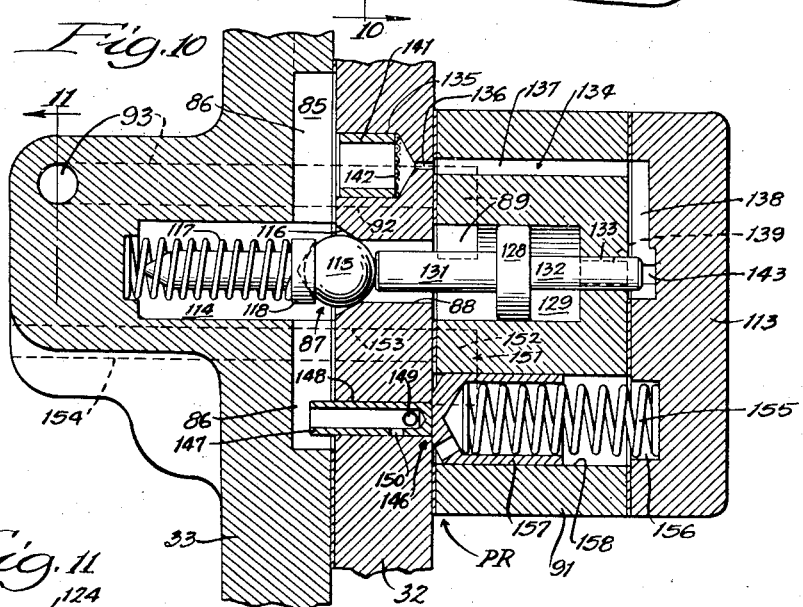
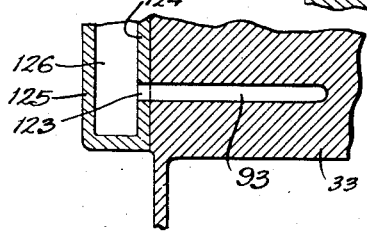
Inventor:
Carl W. Mott,
By Paul O. Pippel
Attorney.

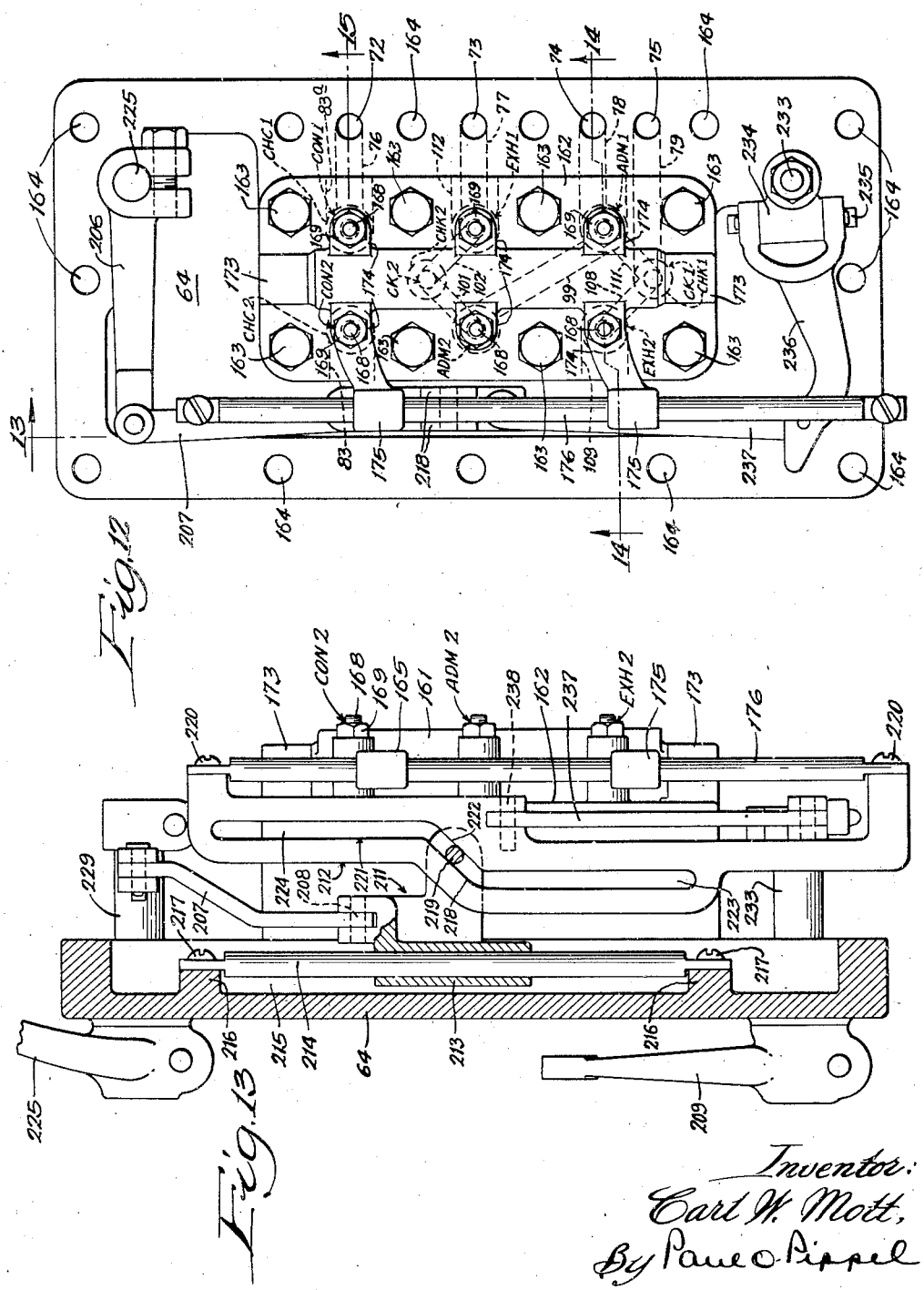

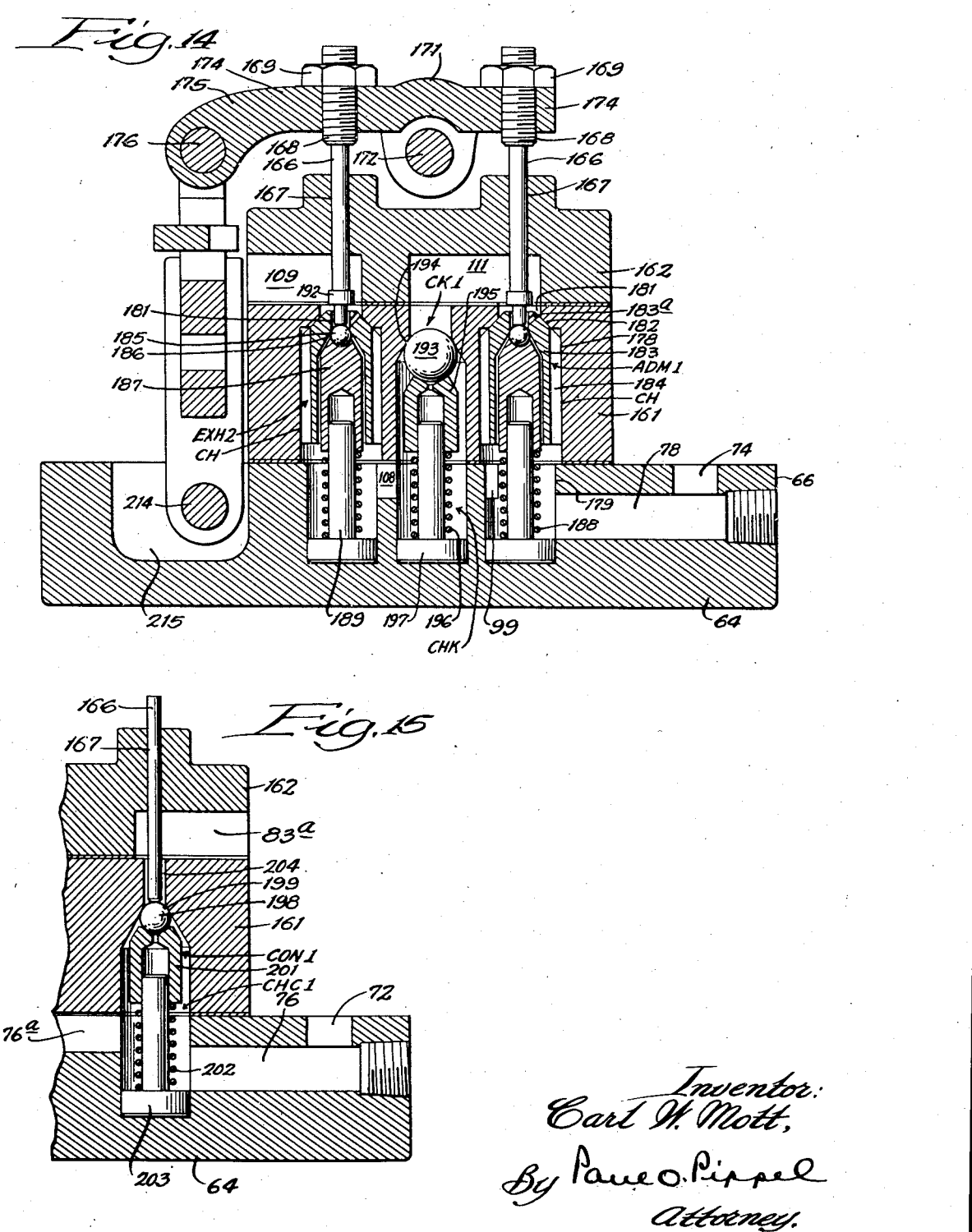

Patented May 7, 1946

2,399,756

UNITED STATES PATENT OFFICE 2,399,756

FLUID CONTROL FOR FLUID-DRIVEN MOTORS

Carl W. Mott, La Grange, Ill., assignor to International Harvester Company, a corporation of New Jersey Application December 31, 1943, Serial No. 516,471

10 Claims. (Cl. 60—52)

This invention has to do with a system of motor control and operation energized by fluid derived from a constant delivery source, and, while the invention is particularly adapted for use in a power lift upon a motor vehicle and is so illustrated herein upon a tractor, numerous features having utility in other fields will be immediately apparent to those skilled in the art.

More specifically the invention relates to a fluid motor operating and control system generally of the character shown in my applications filed herewith Serial No. 516,470, filed December 31, 1943, for Fluid control apparatus and Serial No. 516,468, filed December 31, 1943, for Pressure regulating fluid control apparatus, wherein fluid for driving the motor is obtained from a constant delivery source by closing a normally open by-pass whereby the source will be caused to deliver fluid at a high pressure necessary to drive the motor only during motor operation periods. The pressure regulator is of a type remotely controlled in response to the operation of a control valve to change the pressure of fluid imposed upon a part thereof.

An object of this invention is the provision of an improved arrangement wherein said control valve is operated jointly with an admittance valve which controls communication between the source and motor and wherein these valves are installed in proximity to an operator's station for direct access. Since these valves require force to operate, the sensitiveness of their control is enhanced by avoiding a long or plural-part valve-operating arrangement with the attendant lost motion at joints and strain within the parts themselves.

A further object is the provision of an organization in which the pressure regulator, the motor, and the control and admittance valves are closely grouped to minimize flow resistance and thus facilitate promptness in action of the pressure regulator and motor in response to valve manipulations.

Another object is the provision of a channeled and apertured structure upon which the valves, pressure regulator, and motor are mounted to supply the necessary passages of the fluid system in a fashion minimizing the separate connection and use of hoses or pipes.

A further object is the provision of a new motor and valve panel arrangement in combination with a reservoir for the fluid employed in the system, the arrangement being one in which the cylinder of the motor has an end rigidly secured to a side wall of the reservoir and in which the walls of the reservoir contain channels communicating between the motor cylinder and the valves.

Another object is the provision of a novel arrangement in which the motor cylinder is rigidly secured at an end to a support and in which the piston rod is hollow and contains a pivotal connection for a connecting rod, whereby the connecting rod as well as the piston rod is movable endwise into the cylinder and whereby the over-all length required for the motor and its connection with a rock-shaft to be operated thereby is diminished.

A further object is the provision of a new arrangement of fluid-driven motor, actuating-fluid reservoir, valves and actuating means therefor accessible to an operator and connected with the motor work member by a novel means for automatic operation of the valve means to stop the motor when it has operated to an extent determined by manual manipulation of the valve means.

A further object is the provision of an improved valve mounting plate which serves as a cover for an opening in the reservoir and which removes the valves therewith to simplify their servicing.

Still a further object is the provision of a novel removable reservoir panel with a pocket on its inner side for the reception of oil to be filtered and having a large opening communicating with the reservoir and a filter element covering such opening.

These and other desirable objects inherent in and encompassed by the invention will be better understood by reading the ensuing description with reference to the annexed drawings, wherein:

Fig. 1 is a side elevational view of a tractor upon which there is mounted a preferred form of the invention;

Fig. 2 is a side elevational view of the midportion of the tractor, taken from the side opposite to that shown in Fig. 1, and illustrating both manual and motor-operated valve control members for the apparatus;

Fig. 3 is a horizontal view looking downwardly into a housing for the fluid-driven motor to illustrate the mounting of rock-shaft components driven by the motor, as well as such motor and the reservoir for the actuating fluid, in plan;

Figure 8:
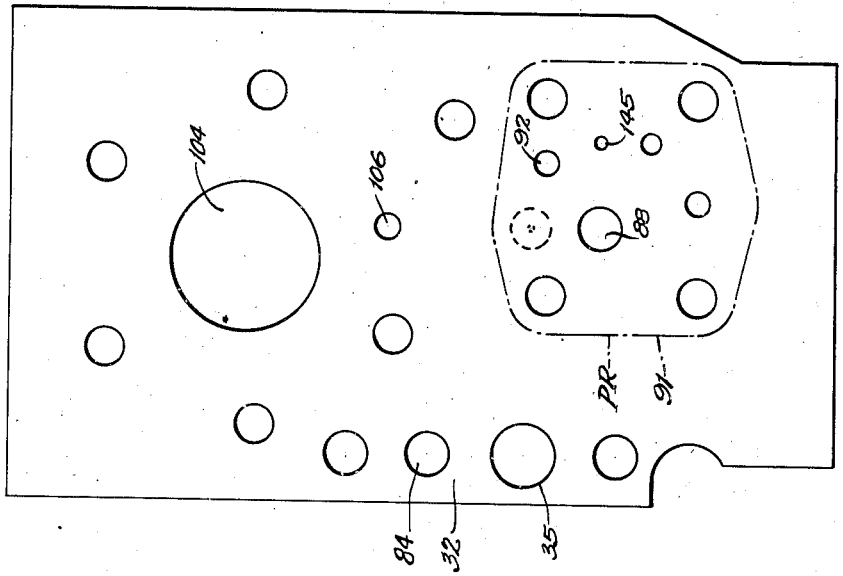
Figure 7:
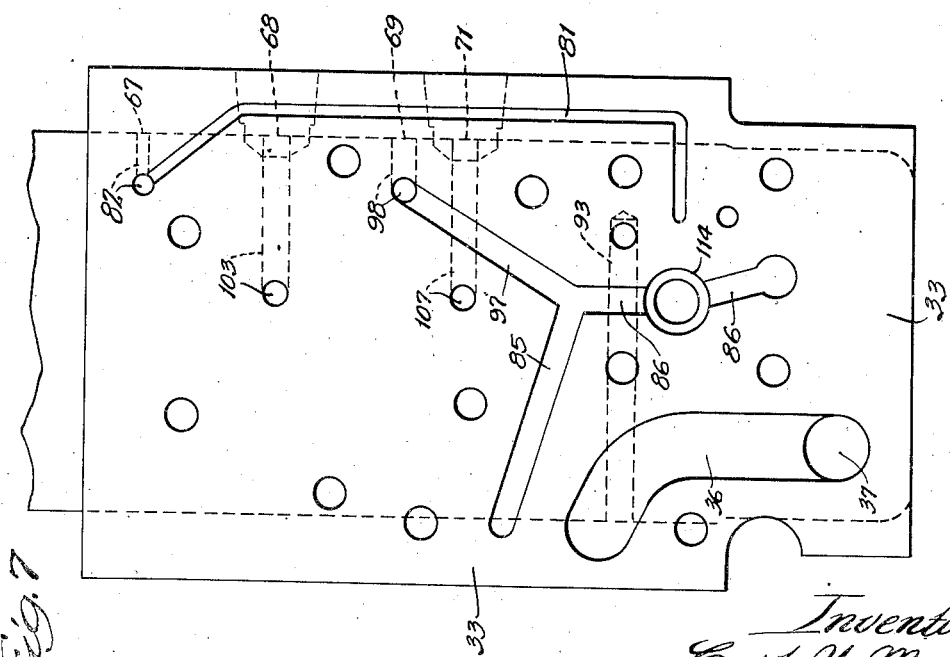

Fig. 4 is a transverse view taken on the line 4 of Fig. 3, illustrating the front wall of the reservoir and the connections thereof of the fluid-driven motor, delivery and return conduits for the supply and return of fluid to and from the motor, and a pressure regulator device for causing the fluid to by-pass the motor at low pressure excepting when the aforesaid admittance and control valves are actuated for causing the motor to perform work;

Fig. 5 is a horizontal sectional view taken through the motor and the actuating-fluid reservoir, taken as indicated by the line 5 in Fig. 4;

Fig. 6 is a view, partly diagrammatic, illustrating the flow of fluid between the various parts of the apparatus to and from the pump both during actuation and quiescent periods of the motor;

Fig. 7 is a front elevational view of the front wall of the reservoir;

Fig. 8 is a front elevational view of a passage-forming and motor-supporting plate which is attached to the front face of the reservoir front wall;

Fig. 9 is a fragmentary view showing a portion of the plate of Fig. 8 assembled with the reservoir front wall and the assembly of the pressure regulating unit with these parts;

Fig. 10 is a sectional view of the pressure regulating unit taken on the line 10—10 of Fig. 9 and illustrating the incorporation into this unit of certain parts and passages formed within the reservoir front wall and in the plate shown in Fig. 8;

Fig. 11 is a fragmentary sectional view taken as indicated by the line 11 in Fig. 10, showing the manner in which the by-pass passage leads from the pressure regulating unit into a section of the reservoir;

Fig. 12 is an elevational view of the inner side of a valve panel forming one side wall of the reservoir, and also showing in elevation valve-operating mechanism and the association thereof with valve stems to be operated thereby;

Fig. 13 is an elevational view looking forwardly of the tractor and taken on the line 13 of Fig. 12 to further illustrate the valve-operating mechanism;

Fig. 14 is a view looking upwardly at the slightly irregular section indicated by the line 14—14 of Fig. 12, to illustrate parts of the valve-operating mechanism as well as certain of the valves controlled thereby; and Fig. 15 is a fragmentary sectional view taken on the line 15 of Fig. 12, this view also being taken in an upward direction and showing one of the control valves for determining when the pressure regulating unit of Figs. 9, 10, and 6 shall be in by-pass condition.

With continued reference to the drawings, the apparatus embodying this invention is installed on a tractor shown in its entirety in Fig. 1. This tractor has rear traction wheels 20, front support wheels 21 steered from a steering wheel 22 through a steering shaft 23 in the usual manner. The body 24 of the tractor is formed rigidly with an engine 25 and at the back of the body a driver's seat 26 is provided for placing the driver or operator seated thereon in readily accessible proximity to the steering wheel 22 and to controls for the tractor and for the fluid-driven apparatus forming this invention.

Fluid for the apparatus is supplied from a pump 27, which is constantly driven from the engine cam shaft by gearing in a housing 30. Fluid is continuously expelled from the pump 27 through a conduit 28 and returned to the pump through a conduit 29 somewhat larger in diameter than the conduit 28. These delivery and return conduits 28 and 29 lead to a coupling member 31, Figs. 3 and 4, which is attached to a plate 32 upon the front wall 33 of reservoir 34, for the motor actuating fluid. The return conduit 29 communicates with the interior of the reservoir through a hole 35 in the plate 32, Figs. 6 and 8, an L-shaped channel 36, in the front face of the reservoir wall 33, Figs. 6 and 7, and a hole 37 at the lower end of this channel extending through such wall; thus, fluid returns to the pump from the reservoir through the hole 37, channel 36, hole 35 in the plate 32, and conduit 29, Figs. 4, 3, 6, and 1. Fluid passed from the motor through the conduit 28, while leading through the conduit attaching member 31 in Fig. 4, does not discharge into the reservoir but into passages which ultimately are selectively communicative with the ends of the cylinder 38 of a motor M, Figs. 4, 5, 6, and 3. In Fig. 3, sections 39 and 41 of a coupling device 42 are respectively upon the interior and exterior sides of a wall 43, which forms a portion of a housing H containing the motor M. The parts of this coupling device 42 are secured together by bolts 44 and provide communication between the portions of the conduits 28 and 29, which are respectively inside and outside of the housing H. A hole 45 in the housing wall 43 accommodates the coupling device 42.

The motor housing H has identical opposed walls 43 and 46, which are connected at their back ends by bolts 47 to the plate 32, and hence indirectly to the reservoir 34. Forward ends of the housing plates 43 and 46 are connected to a bridging member 48, Fig. 3, by bolts 49. This bridging member, as shown in Fig. 1, lies against the back end of the vehicle engine 25 to which it is connected by any standard means. The housing side wall plates 43 and 46 are generally L-shaped with their shorter leg extending vertically and resting upon the tractor body to which they are connected by means of bolts 51 which are screwed into a boss 52 on such body.

The housing H, in addition to enclosing the motor M, provides support for a rock-shaft comprising oppositely extending portions 53 and 54. The inner ends of these rock-shaft portions are arranged coaxially and are clamped together within the split hub 55 of an arm 56 which is bifurcated at its upper end for receiving the forward end of a connecting rod 57, which extends from the motor M. The outer ends of the rock-shaft 53—54 have upwardly extending arms 58 and 59, and, when the connecting rod 57 is moved axially by the energization of the motor M, force will be transmitted through the arm 56 interiorly of the housing H, the hub 55 of such arm, and the rock-shaft portions 53 and 54 connected together within the hub 55 and rotatably supported within the housing walls 43 and 46 for causing rocking of the exterior arms 58 and 59. The purpose of the apparatus constituting this invention is to energize the motor M for causing rocking of the arms 58 and 59 in either direction, so that tools connected to the upper ends of said arms may be power-operated.

In addition to providing a pivotal mounting for the rock-shaft 53—54, the housing H serves as a support for a fuel tank 61. In Fig. 2, saddle straps 62 are shown supporting the fuel tank, and opposite ends of these straps are secured to the housing side walls by bolts 63.

Control of the by-pass condition of the apparatus and of the direction in which fluid pressure is applied to the piston P within the motor M is determined by the manual manipulation of six valves contained within a valve panel 64 forming one side of the actuating fluid reservoir 34. These valves, which are designated CON1, CON2, EXH1, EXH2, ADM1, and ADM2, consist of two groups which are alternatively operated or opened. The first group CON1, EXH1, and ADM1 are operated concurrently when it is desired to cause the motor piston to be driven rearwardly, whereas the group CON2, ADM2, and EXH2 are operated when it is desired to drive the motor piston forwardly. Before undertaking to describe these valves and their control mechanism in detail, a preliminary general description of their operation with the other parts of the apparatus will be given with reference primarily to Fig. 6.

In Fig. 6 there is shown the pump 27, the motor M, the pressure regulator device PR, the left edge of the plate 32, with which the back end of the motor cylinder 38 is assembled, the front face of the front wall 33 of the fluid reservoir, and the outer or left face of the reservoir wall and valve panel member 64. The wall or panel members 33 and 64 are shown slightly in perspective to expose a left edge portion 65 of the member 33 and forward edge 66 of the panel 64. This perspective showing of the members 33 and 64 is for suggesting their actual physical association shown in Fig. 5 where these members can be seen disposed at right angles to one another with the inner face of the panel 64 adjacently to its forward edge 66 laying flatly against the left edge portion 65 of the member 33. This places ports 67, 68, 69, and 71 in the edge portion 65 in communicative registry with ports 72, 73, 74, and 75 of passages 76, 77, 78, and 79 in the panel 64.

When it is desired to cause forward movement of the motor piston P, the manual control of the valves in the panel 64 will be operated for opening the group consisting of the valves CON2, EXH2, and ADM2. This opening of the valve CON2, which is termed a control valve, conditions the pressure-regulating device PR for terminating the by-pass condition, whereby the pump 27 is caused to deliver fluid at high pressure for introduction into the motor cylinder. The manner in which this affects the pressure regulator will be described in detail hereinafter, but tentatively it will suffice to say that the escape of fluid from the pressure regulator through a passage 81 formed jointly by a groove in the front face of the reservoir wall 33 and the plate 32 covering the same, thence through a channel 82 in the wall 33, port 67, port 72 in the valve panel 64, channels 76 and 76ª inwardly toward the interior of the reservoir past the valve CON2 and through a passage 83 into the reservoir 34, will condition the pressure regulator for terminating by-pass; see Fig. 15 showing the valve CON1 and its associated discharge passage 83ª which are arranged similarly to valve CON2 and passage 83.

Prior to this termination of the by-pass condition, fluid flowed in a circuit indicated by the chains of heavier arrows in Fig. 6. By tracing the paths of these heavy arrows it can be seen that, during by-pass, fluid flows from the pump 27 through the conduit 28, through hole 84 in the plate 32, into a Y-shaped channel 85 formed by a groove in the front face of the reservoir wall 33 and covered by the plate 32; thence, downwardly through the vertical leg 86 of this channel, past a by-pass valve 87 (Figs. 6 and 10), a hole 88 in the plate 32, a channel 89 in a body plate 91 of the pressure regulator, a hole 92 in the plate 32, and through a channel 93 in the reservoir wall 33 into the reservoir. Fluid is drawn from the reservoir through the port 37 into the channel 36 in the front face of the reservoir wall 33, thence through the hole 35 in the plate 32, and to the intake side of the pump through the conduit 29. The by-pass condition is terminated by the closing of the by-pass valve 87, preventing flow downwardly through the channel 86 and diverting the flow upwardly through channel leg 97. With the manually operated valves CON2, EXH2, and ADM2 opened, as described above, fluid flowing upwardly from the channel leg 97 will continue in its progress through a channel 98 in the reservoir front wall, ports 69 and 74, valve panel channel 78, diagonal channel 99, inwardly (toward the interior of the reservoir) past the admittance valve ADM2, channel 101, outwardly past a check valve CK2, channels 102 and 77 (without flowing through the exhaust valve EXH1 which is now closed), ports 73 and 68, channel 103 in the reservoir wall 33, and thence into the back end of the cylinder 38 through a large hole 104 in the plate 32.

Simultaneously with the advancement forwardly of the motor piston P by the force received from the fluid introduced into the back end of the cylinder 38, fluid is allowed to escape from the front end of the cylinder back to the reservoir, through a motor casing channel 105, a hole 106 in the plate 32, channel 107 in the front wall of the reservoir, ports 71 and 75, channels 79 and 108 in the valve panel 64 (without flowing through the check valve CK1), thence upwardly past the now open exhaust valve EXH2, and outwardly through an exhaust channel 109 directly into the reservoir.

When it is desired to stop the motor, the valves CON2, ADM2, and EXH2 will be closed, and the valve group CON1, EXH1, and ADM1 will be left closed. Fluid can then no longer escape through the control passage 81 and either of the control valves CON2 or CON1, causing the building up of pressure in a section of the pressure regulator PR, in a manner presently to be described, for again establishing the by-pass condition of the apparatus, so the continuous running pump can cause circulation at low pressure through the conduit indicated by the heavy arrows.

When it is desired to cause movement of the motor piston from front to back, the valve set CON2, ADM2, EXH2, will be left closed and the valve set CON1, EXH1, and ADM1 will be opened. The opening of the control valve CON1 causes the discharge of fluid from the control passage 81 in the same manner that the control valve CON2 was so effective as described above, this passage taking place from the control channel passage 76 inwardly toward the reservoir, past the valve CON1 (see Fig. 15), for discharge directly into the reservoir through a passage 83a. This stops the flow of fluid through the by-pass valve 87 and causes it to flow upwardly in the channel leg 97, through channel 98, ports 69 and 74, and into the control panel channel 78. Since the admittance valve ADM2 is now closed, flow cannot occur upwardly through the diagonal channel 99, but, since the admittance valve ADM1 is open, flow occurs inwardly past this valve into a channel 111, past the check valve CK1, into the channel 79. Channel 79 communicates with channel 108, but, since the exhaust valve EXH2 is now closed, flow cannot occur through the channel 108 and past the valve EXH2. Flow does occur in the channel 79 in the direction opposite to that indicated by the arrows, the flow proceeding through ports 75 and 71, channel 107, hole 106 in the plate 32, and the motor casing channel 105, into the front end of the motor cylinder.

Concurrently with the introduction of fluid into the front end of the motor cylinder, there is an exhaust of fluid from the back end of the cylinder through the large hole 104 in the plate 32, through the channel 103 in the reservoir front wall, ports 68 and 73, channel 77, inwardly past the exhaust valve EXH1 for discharge directly into the reservoir through a channel 112.

Structural details of the pressure regulating device are shown in Figures 7, 8, 9, and 10. While a projecting portion of this device is formed by a thick plate or block 91 and a cap 113 therefor (Figures 4, 6, and 10), the reservoir wall 33 and the plate 32 also form parts of the pressure regulating device. This is apparent from Figure 10. A spring chamber 114 for the by-pass valve 87 of the pressure-regulating device is formed in the reservoir wall 33. This by-pass valve includes a ball 115 urged onto a seat 116 therefor by a spring 117 in the chamber 114 and a ball follower member 118, which is disposed between the spring and the ball. The seat 116 is formed by enlarging the end of the hole 88 through the plate 32. This hole 88 comprises a section of the passage through which fluid is by-passed (when the ball 115 is unseated) to the reservoir, the other sections of the passage including the channel 89 in the back face of the block 91, the hole 92 in the plate 32, and the L-shaped channel 93 in the reservoir wall 33; see Figures 10 and 11 jointly. In Figure 11, one leg of the L-shaped channel 93 is shown communicating through a hole 123 in a reentrant flange 124 of a removable wall 125 of the reservoir 34. Thus, the discharge from the pressure regulator during by-pass will be into a section 126 of the reservoir which is separated from the main section by a filter screen 127. Intake for the pump is through the channel port 37 (Figs. 6 and 7), which communicates with the main part of the reservoir, so that fluid delivered to the pump will first be drawn through the filter screen 127.

Means for unseating the by-pass valve ball 115 for establishing the by-pass condition of the pressure regulator unit PR includes a piston 128 shiftable axially in a cylindrical recess 129 in the block 91. This piston member has stems 131 and 132 that are coaxial therewith respectively abutting the ball 115 and projecting in journaled piloting relation within a hole 133 extending through the block from the closed end of the recess 129. When fluid pressure is applied to the forward end of the piston 128 (the right-most end in Fig. 10), the ball 115 will be unseated for causing by-pass. When the fluid pressure is relieved from the forward end of the piston, the spring 117 is operable to seat the ball and preclude by-pass. Fluid pressure is appliable to the forward end of the piston 128 through a pressure-applying channel 134 which includes a recess 135 in the plate 32, a hole 136 having a limited flow capacity leading from said recess, a hole 137 in the block 91, a channel 138 in the back face of the cap 113, and a hole 139 formed in the bottom of the recess 129 in parallelism with the bearing hole 133. A filter consisting of a sleeve 141 having a filter screen 142 over an end thereof is disposable in the recess 135 to assure that no small particles of foreign material shall lodge in the restricted passage or hole 136.

So long as no fluid can escape from the pressure-applying channel 134, the pressure of fluid imposed through this channel onto the front end of the piston 128 will sufficiently exceed the pressure of the spring 117 and of fluid pressing against the by-pass ball 115 to hold the ball unseated. Upon the diversion of fluid from the pressure-applying channel 134, however, at a rate greater than the fluid can be replaced through the restricting hole 136, the pressure upon the front end of the piston will be so diminished that the pressure of fluid in the channel leg 86, augmented by the force of the spring 117, will prevail in seating the ball, and, after the ball is seated, the force of the spring 117 will be stronger than the reactive force of the fluid upon the forward end of the piston 128 while there is diversion of such fluid.

Diversion of fluid from the pressure-applying passage 134 is under control of either of the control valves CON1 and CON2, Figs. 6 and 12. A control passage leading to these valves from the pressure-applying passage 134 includes a channel 143, Figs. 9 and 10, a hole 144 through the block 91, Fig. 9, a hole 145 in the plate 32, Figs. 6 and 8, channel 81, Figs. 6 and 7, channel 82, ports 67 and 72, Figs. 6 and 7, and channel 76ᵃ in the control panel 64, Fig. 6. If the control valve CON1 should be opened, fluid can escape through the just-traced control channel past said control valve for discharge directly into the reservoir through the passage 83ᵃ, or, should the valve CON2 be opened, the fluid can escape past this valve and through the channel 83 into the reservoir.

It is possible to control the speed at which the motor work member or piston is moved by throttling or adjusting the degree to which the admittance valves ADM1 or ADM2 are opened. With either of these admittance valves operating in a throttling position, the delivery of the pump will exceed the rate at which fluid can be forced into the motor cylinder and thereby create an undesirably high pressure condition within the system, unless some means is made to prevent this. In the present apparatus, this condition is met by a pressure relief valve 146, Fig. 10, which includes a hollow open-ended plunger 147 slidable within a hole 148 through the plate 32. The hole 148 as well as the interior of the plunger communicates with a lower portion of the fluid delivery channel leg 86. A plurality of holes 149 and 150 are formed in the side wall of the plunger 147 adjacently to its front end which is closed, so that, should the plunger be moved axially forwardly, one or more of these holes, depending upon the extent of movement, would communicate with a pressure relief passage 151 which includes a channel 152 in the back face of the block 91 and holes 153 and 154, respectively, in the plate 32 and the reservoir front wall. A spring 155 seated within a shallow recess 156 in the pressure regulator cap 113 bears rearwardly within a spring cup 157, which is slidable within a cylindrical hole 158 in the block 91 to press this cup against the front end of the plunger 147 and to thereby maintain the plunger in the non-fluid-passing condition except during periods of abnormally high pressure fluid in the channel 86. Upon sufficiently high pressure being attained in the channel 86, the plunger 147 will be pressed forwardly incident to moving the spring cup 157 forwardly while compressing the spring 155, to permit the escape of excessively high pressure fluid.

Passing now to the details of the control valve panel 64, the valves thereon and the valve-controlling linkage, reference should be had to Figs.

12 to 15. The valve-supporting panel 64 has a plate 161 secured to its inner face and a cap plate 162 secured to the inner face of the plate 161. Bolts 163 extend through both of the plates 162 and 161 into threaded recesses in the panel 64 for securing these parts in assembly. Bolt holes 164 about the edge of the panel 64 are for the reception of bolts 165, Fig. 2, which secure this panel in place upon its side of the motor-propelling fluid reservoir.

Each of the six manually-operated valves is operated through a valve-stem 166 slidable in a bearing opening 167 therefor in the cap or cover plate 162. The inner ends of these valve stems (the upper ends as viewed in Figure 14) are abuttable by adjustable tappet members 168, which are held in their adjusted position by lock-nuts 169. These threaded tappet members 168 are carried within arms projecting laterally from a rockable member 171 pivoted upon a rod 172, Fig. 14, having its ends mounted within bosses 173, respectively, at the upper and lower ends of the cover plate 162. Said arms projecting laterally from the rockable member 171 are designated 174, and two of these arms projecting backwardly to the left, as viewed in Fig. 12, are provided with bearings 175 at their ends for slidably and rotatably containing a rod 176. Bodily movement of this rod 176 inwardly or outwardly (of the reservoir), toward and from the observer in Fig. 12, or up and down in Fig. 14, will cause the member 171 to rock about the bearing rod 172 therefor, whereby rocking of the member 171 in one direction will cause the valve stems upon one side of the member 171 to be depressed for opening their group associated valves while leaving closed the group of valves associated with the other valve stems. Rocking of the member 171 in the opposite direction will reverse the operation of the groups of valves. In Fig. 14 the rockable member 171 is shown in the neutral position in which neither set of valves is open.

Before explaining the mechanism for controlling rocking of the valve control member 161, a brief description will be given of the valves on the control panel 64 and the passages interconnecting certain of them. For this part of the description, reference should be had to Figs. 12, 14, and 15.

In Fig. 14, the admission valve ADM1 and the exhaust valve EXH2 each include a valve chamber CH. Valves ADM2 and EXH2 include similar chambers, and the valves ADM1, ADM2, EXH1, and EXH2 are themselves identical in construction. Valves of this character are fully described and claimed in my copending application, Serial No. 500,502, filed August 30, 1943. Each of the valve chambers CH includes a recess 178 in the plate 161 and a recess 179 in the panel proper 64. Each recess 178 has an outlet opening 181 at its upper end and a valve seat 182 about such opening 181.

A primary valve member 183 is cylindrical for slidable axial adjustment in the recess 178 and has axial fluid conducting channels 184 in its outer periphery. Secondary valve members of the valves as EXH2 and ADM1 are in the form of balls 185 pressable against a secondary valve seat 186 within the upper ends of the primary valve members 183 by spring-pressed plungers 187 acted upon by springs 188 upon their lower ends. Guides 189 for the springs 188 are disposed within the valve chamber recesses 179. The valve stems 166 are movable downwardly from the neutral positions shown in Fig. 14 for displacing the secondary valve members 185 from their seats 186 to permit the escape of fluid upwardly between the plungers 187 and the interior of the hollow primary valve members 183, past the seats 186, and outwardly of the primary valve members through holes 191 in their upper ends. This permits the escape of fluid from the valve chamber and an introduction of fluid into the space above the valve chamber, reducing the difference in fluid pressure upon two sides of the primary valve member, so it can be opened more easily upon the subsequent abutment therewith of an enlargement 192 upon the associated valve stem 166. Thus, in the operation of any of the valves as ADM1 and EXH2, there is an initial opening stage in which the secondary valve members 185 are opened to cause partial equalization of pressure by the displacement of a small frontal area against the pressure of fluid, and a second stage in which the larger frontal area of the primary valve member is displaced against the diminished differential pressure bias to incur a large volume of flow.

The two check valves CK1 and CK2 are in chambers CHK1 and CHK2, each including communicating recesses respectively in the plate 161 and in the panel proper 64. Each check valve includes a ball member 193 normally held against a seat 194 by a follower 195 and a spring 196 pressing upwardly thereon. A spring guide 197, resting upon the bottom of the chamber CHK, is also provided for these valves. Short bores 183ª diagonally intersecting the passages 181 just above the valve seats 186, allow the fluid to escape upwardly from the unseated balls 185, while the stem enlargements 192 rest on the upper ends of the members 183 in restricting relation with the passages 181.

In the case of the control valves CON1 and CON2, they are also similarly constructed, and their construction is similar to that of the check valve. Referring to Fig. 15, the check valve CON1 can be seen to include a ball 198 urged against seat 199 by a ball follower 201, which is urged upwardly by a spring 202 stabilized by a spring guide member 203 rested upon the bottom of a chamber CHC for the valve. When the ball is unseated downwardly by the associated valve stem 166, fluid can escape upwardly over the valve seat 199 and through a channel 204 into the exhaust port as 83ª associated with such valve.

Referring now to Figs. 12 and 14, the fluid in the channel 78 can be seen to communicate with the lower end of the valve chamber of the valve ADM1 and to also communicate with the lower end of the valve chamber for the valve ADM2 through the diagonal channel 99 formed in the inner face (facing upwardly in Fig. 14) of the panel 64. Thus, when either of the valves ADM1 or ADM2 is opened, fluid under pressure can escape upwardly through the valve chamber thereof past the valve. In the case of the valve ADM1, the fluid escaping upwardly therepast flows into the channel 111 formed in the underface (as viewed in Fig. 14) of the plate 162 and thence into the chamber CHK1 of the check valve CK1 by displacing the ball 193 downwardly. From the check valve chamber the fluid is directed through the channel 79, as shown in Figure 12 in dotted outline, and outwardly of the panel through the port 75.

When the fluid admission valve ADM2 is opened, the fluid reaching the bottom or outer end of the valve chamber CH thereof through the diagonal channel 99 in the inner face of the panel 64 will flow inwardly (upwardly as the panel 64 and the plates 161 and 162 thereon are observed in Fig. 14) through the chamber and outwardly into the channel 101 shown in dotted outline in Fig. 12 and which is formed in the outer face of the plate 162 similarly to the formation of the channel 111 shown in Fig. 14. From the channel 101, the fluid then forces its way outwardly (downwardly as the parts are disposed in Fig. 14) past the check valve CK2 and into the channel 102 also shown in dotted lines in Fig. 12, and formed in the inner face of the panel 64 (upper face of such panel as the parts are disclosed in Fig. 14) similarly to the channel 108, Fig. 14, for direct communication with the outer end of the chamber of the exhaust valve EXH1. This outer end of the chamber of the exhaust valve EXH1 communicates with the port 73 through the buried channel 77 in the panel 64, so that fluid entering the outer end of the chamber of the valve EXH1 from the channel 102 is dischargeable through the port 73 without the exhaust valve EXH1 being opened. However, when the exhaust valve EXH1 is open, fluid exhausted from the motor and directed into the port 73 is flowable through the channel 77 and inwardly of the reservoir through the chamber of the valve EXH1 and outwardly into the reservoir through the relatively large discharge channel 112 which is arranged similarly to the channel 109 in Fig. 14. A comparable arrangement is shown in Fig. 14 for the exhaust valve EXH2 where the channel 108, corresponding to the just-mentioned channel 102, leads from the associated check-valve member CHK1 into the outer part of the chamber of the exhaust valve EXH2. However, since the exhaust valve EXH2 is never open while the admittance valve ADM1 is open, the channel 108 does not serve to deliver to and past the exhaust valve EXH2 any fluid which is being admitted into the check-valve member CHK1 past the ball 193. But the passage 108 does serve to exhaust fluid received from the motor through the port 75, Fig. 12, channel 19, valve chamber CHK1, passage 108, and into the reservoir 34 through the port 109 when the valve EXH2 is opened.

Fluid from the pressure-applying passage 134, Fig. 10, of the pressure regulator is introduced into the outer end of the control valve chamber CHC1, Fig. 15, through the port 72 and the passage 76, and the cross-channel 76ᵃ in the inner face of the panel 64 causes like impression of fluid into the outer end of the control valve chamber CHC2, Fig. 12. Therefore, when the valve CON1 is opened, fluid can escape from said pressure-applying passage 134, channels 143, 141, 81 (Figs. 9, 10, and 6), channel 82, and port 67 (Fig. 6) and through the port 72 (Figs. 6 and 15) and outwardly into the reservoir 34 through the channel 83ᵃ, and when the valve CON2 is opened in lieu of the valve CON1, the fluid entering the port 72 can escape through the channel 76, the cross-channel 76ᵃ in said valve CON2 and the channel 83, Figs. 6 and 12.

The mechanism for operating the rockable control member 171, illustrated in Figs. 2, 12, 13, and 14 like the above described valves, is carried upon the panel 64 and is removed from the reservoir with such panel when the latter is detached as for servicing such mechanism or valves. Valve-operating mechanism of this general character is shown and claimed in my copending application Serial No. 466,463, filed November 21, 1942. The present valve-operating mechanism includes a pair of cam means counterparts respectively designated 211 and 212. Counterpart 211 has a base portion 213 which is freely slidable lengthwise of a reaction rod 214. This rod, to conserve space, is disposed within an elongated recess 215 in the inner face of the panel 64 where such rod is secured to bosses 216 by any standard fastening means 217. A pair of spaced ears 218 mutually carry a pin 219, which rides within a slot 221 of the counterpart 212. This slot 221 includes a diagonal mid-portion 222 and end portions 223 and 224 which extend lengthwise of the rods 176 and 214. Said counterpart 212 is rigidly secured to the laterally displaceable rod 176 at its ends by machine screws 220. The rod 176, it will be recalled, is pivotally mounted in the bearings 165 and 175 upon the rockable member 171 and is also freely slidable endwise in these bearings. Relative movement of the counterpart elements 211 and 212 lengthwise of the rods 214 and 176, while the pin 219 is in the diagonal slot portion 222, will exert a force between the fixed reaction rod and the laterally displaceable rod 176 for displacing the latter either to the right or to the left, as viewed in Fig. 13, depending on the direction of relative movement, and this lateral displacement of the rod 176 will, of course, cause the rockable control member 171 (Fig. 14) to be pivoted from its neutral position for selectively opening the valve sets CON1—EXH1—ADM1 and CON2—ADM2—EXH2.

In the present arrangement, the slidable follower member 211 is manually controlled or moved by means of a manually operated lever 225; see Figs. 1, 2, 3, 4, and 13. In Figs. 2, 3, and 4 lever 225 is shown in association with a quadrant 226 over which it is adjustable. A stop 227, which is selectively settable in registry with apertures 228 on the quadrant 226, can serve as a guide to enable the operator to move the lever 225 to a preselected position. The lower end of the lever 225 is fixed upon the outer end of a shaft 229 which is rotatable in the panel 64. An inner portion of the shaft 225 has an arm 206 fixed thereto, and a projecting end of said arm 206 is pivotally connected to the upper end of a link 207 which has its lower end pivotally connected at 208 with the slidable cam means counterpart 211.

Motor driven means is provided for moving the cam means counterpart 212. This motor-driven means comprises an arm 209 (Figs. 2, 3, 4, 5, and 13) upon the outer side of the valve panel. The upper end of the arm 209 is pivotally connected with the back end of a rod 231, of which the front end is pivotally connected with the upper end of an arm 232 (Figs. 2 and 3) which is fixed to the rockable shaft 53—54. Referring now to Figs. 12 and 13, the inner end of a shaft 233 to which the external arm 209 is non-rotatably connected, rigidly carries a knuckle member 234 upon its inner end. This knuckle member has a bearing pin 235 journaled therein for rotation about an axis normal to the axis of said shaft 233. An arm 236 has a bifurcated end secured to opposite ends of the pin 235, whereby said arm is free to pivot about an axis normal to the shaft 233 but is constrained for pivotal movement with the shaft 233 about its axis. The projected end of the arm 236 is pivotally connected with a link 237 which has its upper end pivotally connected at 238 to the cam counterpart 212. By the train of arms, shafts, and links just described, the cam element 212 is so connected with the piston or work member of the motor M in Figure 3 that upon actuation of the motor in response to a manual manipulation of the arm 225, Figs. 2, 3, and 13, for sliding the cam means element 211, say in a downwardly direction for displacing cam means element 212, to the right as viewed in Fig. 13 for pivoting the rockable control member 171 clockwise as viewed in Fig. 14 to open the valve set CON1—EXH1—ADM1 and thus incur movement of the motor worker member in a rearward direction, said train will incur counter-clockwise rotation of the shaft 233 as viewed in Fig. 12 and downward movement of the link 237 and said cam means element 212 for reestablishing the diagonal slot portion 212 in its neutral centered relation with respect to the pin as illustrated in Fig. 13. Thus following a movement of the manual control lever 225 in a rearward direction over its quadrant 226, a selected distance for causing a corresponding displacement of the cam means pin 219 of Figure 13, the consequent ensuing operation of the motor M will be correlated in the amount of its operation by the linkage which reestablishes the neutral position of the valve means element 212 with the element 211.

Operation of the manual control lever 225 in a forward direction will cause upward movement of the cam means element 211 in Fig. 13 for imparting force to the element 212 for pivoting the rockable member 171 in Fig. 14 counter-clockwise for opening the other set of valves CON2—ADM2—EXH2 and thereby causing forward movement of the motor work member or piston; and this forward movement of the motor piston is effective through the arm 232 of Fig. 3, link 231, arm 209 of Figs. 2, 3, and 13, shaft 233, arm 236, and link 237 for moving the cam means element 212 upwardly for reestablishing the cam slot 222 in the neutral relation with respect to the pin 219 upon the motor completing an operation correlated in amount with the movement of the manual control lever. Said reestablishment of the cam slot 222 in the neutral relation illustrated in Fig. 13 with respect to the pin 219 will, of course, return the rockable member 171 to its neutral position of Fig. 14, causing all valves operated thereby to be closed.

Movement of the cam means element 211 in a downward direction by the manual manipulation of the lever 225 to the lower end of the diagonal slot portion 222 will be effective for rotating the rockable control element 171 in Fig. 14 sufficiently clockwise for fully opening the valve set CON1—EXH1—ADM1. However, should the operator desire to cause the motor piston to be advanced a considerable distance within its range of movement, he may immediately move the manual lever 225 to the point upon the quadrant 226 of Fig. 2 corresponding to such desired distance pursuant to advancing the pin 219 downwardly within the cam slot portion 223 without imparting further pivotal movement to the rockable member 171 in Fig. 14. The valves CON1, EXH1, and ADM1 will simply remain open during this adjustment and cause the motor to continue its operation until the valve means element 212 is moved downwardly by the motor sufficiently far to overtake the pin 219 with the diagonal slot portion 222 for reestablishing the neutral condition of the valves. A like cycle of operation takes place when manual lever 225 is operated in the opposite direction for moving the pin 219 upwardly into the slot portion 224, the only difference being that the motor piston is moved forwardly, instead of rearwardly.

In Fig. 1 the reservoir which carries the control panel 84 can be seen to occupy a position on the tractor just ahead of a box 241 for containing a battery. This box is supported on brackets 242 adjacently to and forwardly of a gear shifting lever 243. The box 241 supports a panel 244 for instruments 245 and 246 which are visible to an operator in the seat 26. A small casing 247 on the right side of the reservoir 34 encloses the connections of a throttle lever 248 with a linkage (not shown) extending to parts of the engine 25. The reservoir 34 also supports a bearing and stabilizer bracket 250 for the steering shaft 23. This expedient and compact arrangement of the described parts makes it necessary for the reservoir 34, the motor M, and the housing H (supporting the rock-shaft 53—54 and enclosing the motor) to be confined within the limited space between the battery box 241 and the engine 25.

The manner in which these parts are disposed in this comparatively short space is contributed to by the mode of attaching the motor connected rod 57 of Fig. 5 with the piston P; that is, the particular connection used between the connecting rod 57 and the motor piston makes it possible to shorten the over-all required length of the motor and the connecting rod while employing a motor with a sufficiently long actuating stroke for operating the rock-shaft 53—54 without employing undesirably high pressure for the motor actuating fluid. Said motor piston P includes a piston rod 249 having a cylindrical head 251 containing a slot 252 in its left-end as viewed in Fig. 5. Said head 251 also contains a diametric hole for a pin 253 for retaining a cylindrical crosshead member 254 on said piston rod-head. The tubular or cylindrical cross-head member 254 has a sealing fit upon the piston rod-head and has a sliding sealing fit within a hole or opening 255 in the front end wall of the motor cylinder. A flattened back end portion 256 of the connecting rod 57 is inserted into the slot 252 where it is pivotally connected with the piston and to the piston-rod head by a pin 257.

Having thus described the preferred form of the invention with the view of thoroughly illustrating the same, I claim:

1. In an energization control system for a hydraulically driven motor having a work member moved responsively to energization of the motor by the delivery thereto of fluid obtained from a reservoir; the combination of a detachable side wall panel for said reservoir; valve means on said panel, said valve means being manipulatable from and to a neutral setting to respectively cause and terminate such delivery of fluid to the motor; and valve operating means comprising respectively manually adjusted and motor-adjusted counterparts on the inner side of said panel, the adjustment of either counterpart being effective complementally with the other, when adjusted, to manipulate the valve means, manual and motor-operated control shafts respectively for the manual and motor-adjusted counterparts and journalled in said panel to present inner shaft portions inwardly of the panel and outer shaft portions outwardly of the panel, operating connecting means between the inner shaft portions and their associated counterparts for adjusting the same when the shafts are rotated, a manually operated control member connected with the outer portion of the manual control shaft and movable for effecting rotation of the same in the manipulation of the valve means from neutral, and motor-driven means connected between the motor work member and the outer portion of the motor-operated control shaft for rotating said shaft in the direction and at the rate to reestablish the neutral setting of the valve means upon movement of said work member an amount correlated with the amount of movement of said manually operated control member.

2. In an auxiliary power supplying arrangement for a tractor having a body on which there is an upwardly projecting engine and an operator's station on and spaced axially of said body from said engine; the combination of a hydraulically driven motor upon said body in the space between the engine and operator's station, said motor having a work member which is moved when propelling fluid is delivered to said motor, a pump driven from said engine to deliver propelling fluid to the motor, a reservoir from which such fluid is withdrawn by the pump and for the reception of fluid discharged from the motor, said reservoir being mounted on said body in the said space and between the motor and the operator's station, valve means in the reservoir, said valve means being in control of the fluid delivery to the motor and manipulatable from and to a neutral setting to cause and terminate such fluid delivery, valve operating counterparts in the reservoir, one of said counterparts being manually adjustable and the other motor adjustable and either counterpart being operable complementally with the other, when adjusted, to manipulate the valve means, manually operated and motor-operated rotatable control shafts extending into the reservoir respectively into operative connection with the manually adjustable and motor adjustable counterparts, a manually operated control member connected with the manual control shaft accessibly to an operator at said station and manually movable for effecting rotation of said shaft in the manipulation of the valve means from neutral, and motor-driven means connected between the motor work member and the motor-operated control shaft for rotating said shaft in the direction and at the rate to reestablish the neutral setting of the valve means upon movement of said work member an amount correlated with the amount of movement of said manually operated control member.

3. In an auxiliary power supplying arrangement for a tractor having a body on which there is an upwardly projecting engine and an operator's station on and spaced axially of said body from the engine; the combination of a hydraulically driven motor upon said body in the space between the engine and operator's station, said motor including a work member which is moved when propelling fluid is delivered to said motor, a pump driven from the engine to deliver propelling fluid to the motor, a reservoir from which such fluid is withdrawn by the pump for delivery to the motor, means for mounting the reservoir on said body in said space and between the motor and the operator's station, said reservoir having a wall opening, a panel detachably secured to the reservoir in closing relation with said opening, valve means mounted on the inner side of said panel for withdrawal thereby through said opening when the panel is detached, said valve means being in control of the fluid delivery to the motor and manipulatable from and to a neutral setting to cause and terminate such fluid delivery, and valve operating means including valve manipulating parts also mounted on the inner side of said panel for disassembly therewith from the reservoir, control shafts on and extending rotatively through said panel into respective operating connection with said valve manipulating parts, said parts being complementally operable to manipulate the valve means by the rotation of either of said shafts, a control handle on an outer portion of one of said shafts accessibly to an operator at said station for the rotation of such shaft to effect manipulation of the valve means from the neutral setting to cause movement of the motor work member, and means connecting said work member with an outer portion of the other shaft to rotate the same in the direction and in an amount to manipulate the valve means into its neutral setting upon the work member moving a distance predeterminedly correlated with that which said handle has been moved.

4. In an auxiliary power supplying arrangement for a tractor having a body on which there is an upwardly projecting engine and an operator's station on and spaced axially of said body from the engine; the combination of a reservoir for motor-propelling fluid in the space between the engine and operator's station and within convenient reach of the hands of an operator at such station, a hydraulically driven motor within said space between the reservoir and the engine and including a cylinder mounted on a wall of the reservoir and projecting endwise toward said engine, the motor also including a piston moved axially in the cylinder when propelling fluid is delivered to said motor, a pump driven from the engine to deliver propelling fluid to the motor, conduit means for circulation of the fluid between the reservoir, pump and motor and including ducts in said wall of the reservoir, said reservoir having a wall opening, a panel detachably assembled with the reservoir in closing relation with said opening, said panel having ducts also forming part of said conduit means and disposed in complemental communication with said wall ducts when assembled with the reservoir, valve means mounted on the inner side of said panel for withdrawal thereby through said opening when the panel is disassembled, said valve means controlling the flow of fluid through the panel ducts and being thereby operable when manipulated from and to a neutral setting to cause and terminate fluid delivery to the motor, and valve operating means including valve manipulating parts also mounted on the inner side of said panel for disassembly therewith from the reservoir, control shafts on and extending rotatively through said panel into respective operating connection with said valve-manipulating parts, said parts being complementally operable to manipulate the valve means by the rotation of either of said shafts, a control handle on an outer portion of one of said shafts accessibly to an operator at said station for the rotation of such shaft to effect manipulation of the valve means from the neutral setting to cause movement of the motor piston, and means connecting said piston with an outer portion of the other shaft to rotate the same in the direction and in an amount to manipulate the valve means into its neutral setting upon the piston moving a distance predeterminedly correlated with the distance of handle movement.

5. In an energization control system for a motor having a work member which is moved when the motor is energized; the combination of a control rail laterally displaceable from and to a neutral position to respectively cause energization and deenergization of said motor; a reaction rail disposed in spaced parallelism with the control rail; cam means comprising a cam element and a cam follower element respectively connected with said rails for adjustment axially thereof, the cam element having a slot with an intermediate portion directed diagonally of the rails and end portions extending parallel with said rails, the follower element being disposed in said slot to cause the elements to exert a force between said rails for laterally displacing the control rail incident to relative movement of said elements axially thereof while the follower element is in the diagonal slot portion; means for imparting such axial movement to one of said elements in selective amounts to displace the control rail from its neutral position; and means for moving the other element for restoring the control rail to its neutral position, comprising a shaft mounted for pivoting about an axis generally parallel with and spaced from a plane common to said rails, an arm pivoted to said shaft about an axis normal thereto, means connecting said arm with the other of said elements for imparting said axial movement thereto when said arm is rotated with said shaft, but constrained to rotate with said shaft and means connecting said shaft with the motor work member to rotate said shaft and arm in the direction to relatively move said elements for restoring the neutral position of the control rail upon the work member moving a distance correlated with the selected movements of the one element.

6. In an energization control system for a hydraulically driven motor having a work member which is moved when the motor is energized by the delivery thereto of fluid obtained from a reservoir; the combination of a detachable side wall panel for said reservoir; valve means on said panel to control the delivery of said fluid to the motor and hence the energization; a valve control rail spaced inwardly from the inner side of said panel and displaceable laterally from and to a neutral position to set the valve means for respectively causing energization and deenergization of the motor; a reaction rail disposed on the inner side of said panel in spaced parallelism with the control rail; cam means comprising a cam element and a cam follower element respectively connected with said rails for adjustment axially thereof, the cam element having a slot with a portion directed diagonally of the rails and an end portion extending lengthwise of the rails, the follower element having a portion in said slot to cause the elements to exert a force between said rails for displacing the control rail incident to relative movement of said elements axially thereof while the follower element portion is in the diagonal slot portion; means for imparting such axial movement to one of said elements in selective amounts to displace the control rail from its neutral position; and means for moving the other element for restoring the control rail to its neutral position, comprising a rotatable shaft extending inwardly through said panel to dispose inner and outer portions upon inner and outer sides of the panel, means connecting the inner shaft portion with the other of said elements for imparting the axial movement thereto when the shaft is rotated, and means for connecting the outer portion of said shaft with the motor work member to rotate said shaft in the direction to move said other element for establishing the relative position of said elements that restore the neutral position of the control rail upon the work member moving a distance correlated with the selected movements of the one element.

7. In an energization control system for a hydraulically driven motor having a work member which is moved when the motor is energized by the delivery thereto of propelling fluid; the combination of a valve panel; valve means on said panel adjustable from and to a neutral setting to respectively cause and terminate the delivery of fluid to the motor; a valve adjusting mechanism on said panel including counterparts each reactive against the other when moved relatively thereto to effect adjustment of said valve means; a manually rotatable control shaft journaled in said panel; means connecting one of the counterparts with said shaft so that when it is rotated the energizing relative movement of said counterparts will incur adjustment of the valve means from the neutral setting to energize the motor a motor-driven control shaft journaled in said panel; means connecting the motor work member with said motor-driven shaft to rotate the same coordinately with the movement of said work member during such motor energization; and means connecting the motor-driven shaft with the other of said counterparts for moving the same to establish the neutral setting of the valve means upon movement of the work member an amount correlated with the rotation of the manually rotatable control shaft.

8. In an energization control system for a hydraulically driven motor having a work member which is moved when the motor is energized by the delivery of propelling fluid thereto; a circulation system through which such fluid is deliverable to the motor; a reservoir for such fluid, said reservoir having a wall opening and containing ducts included in said circulation system; a valve panel detachably assembled with the reservoir in closing relation with said wall opening, said panel having ducts disposed in communicative registry with the reservoir wall ducts for inclusion in said circulation system when the panel is assembled with the reservoir; valve means on said panel in control of fluid through said ducts and hence to the motor, said valve means being adjustable from and to a neutral setting to respectively cause and terminate the delivery of fluid to the motor; valve adjusting mechanism on said panel including counterparts each reactive against the other when moved relatively thereto to effect adjustment of said valve means; a manually rotatable control shaft journalled in said panel; means connecting one of the counterparts with said shaft so that when it is rotated the energizing relative movement of said counterparts will incur adjustment of the valve means from the neutral setting to energize the motor a motor-driven control shaft journalled in said panel; means connecting the motor work member with said motor-driven shaft to rotate the same coordinately with the movement of said work member during such motor energization; and means connecting the motor-driven shaft with the other of said counterparts for moving the same to establish the neutral setting of the valve means upon movement of the work member an amount correlated with the rotation of the manually rotatable control shaft.

9. The combination set forth in claim 8, wherein said motor comprises a casing having ducts conductive of said fluid, and wherein said motor is secured to the reservoir with said motor ducts in communicative registry with certain of the reservoir ducts for inclusion therewith in said circulation system.

10. In a hydraulic motor control system comprising a motor-propelling-fluid reservoir having a wall opening, an issuing port from which such fluid is issuable under pressure and motor ports alternately respectively receivable of and exhaustive of fluid for delivery to and exhausted from the motor for causing its operation in respectively opposite directions; the combination of a valve panel detachably assembled with the reservoir in closing relation with said opening, said panel having a duct system in communicative registry with said ports while the panel is so assembled; valve means disposed in said duct system and selectively settable from a neutral condition wherein the duct system is rendered non-communicative between said ports into alternative non-neutral conditions in which the duct system establishes communication between the issuing port and a respective one of the motor ports while establishing communication between the other motor port and the reservoir; and means for setting said valve means comprising a member rockable about an axis in opposite directions from a neutral position to set the valve means in respective of its non-neutral conditions, a reaction rail on the inner side of said panel in parallelism with the rockable member axis, cam means comprising a cam element and a cam follower element respectively connected with the rockable member and with said rail for independent adjustment axially of said rail, the cam element having a slot with a portion directed diagonally of said rail and end portions extending lengthwise of said rail, the follower element having a portion in said slot to exert a force between said rail and the rockable member for rocking the same incident to relative movement between the elements axially of the rail while said follower portion is in the diagonal slot portion, a shaft extending through and journalled in said panel, an arm constrained for rotation with said shaft and a link pivotally connected with said arm and with the rail-connected cam means element for adjustment thereof when the shaft is pivoted, a second shaft extending through and journalled in said panel, a second arm pivoted to such shaft for movement about an axis normal thereto but constrained to rotate with such shaft, and a link pivotally connected with the second arm and with the rockable-member-connected cam means element for adjustment thereof when the second shaft is pivoted.

CARL W. MOTT.